United States Patent [19]

Lashbrook

[11] Patent Number: 5,189,923
[45] Date of Patent: Mar. 2, 1993

[54] ANTIBACKLASH RACK ASSEMBLY
[75] Inventor: Paul H. Lashbrook, Valparaiso, Ind.
[73] Assignee: Bimba Manufacturing Company, Monee, Ill.
[21] Appl. No.: 825,056
[22] Filed: Jan. 24, 1992
[51] Int. Cl.⁵ .................... F16H 55/18; F16H 1/04
[52] U.S. Cl. .................................. 74/409; 74/422
[58] Field of Search ................................ 74/409, 422
[56] References Cited

U.S. PATENT DOCUMENTS

| 3,179,015 | 4/1965 | Kurt | 74/409 X |
| 3,979,968 | 9/1976 | Ceccherini | 74/409 X |
| 4,228,696 | 10/1980 | Jablonsky | 74/409 X |
| 4,784,234 | 11/1988 | Naito et al. | 74/409 X |
| 4,788,878 | 12/1988 | Morita et al. | 74/409 X |

Primary Examiner—Dirk Wright
Attorney, Agent, or Firm—Lockwood, Alex, FitzGibbon & Cummings

[57] ABSTRACT

An antibacklash rack and pinion assembly includes longitudinally movable first and second rack members which have gear teeth thereon which mesh with the gear teeth of the pinion gear. A spring exerts a force in the same longitudinal direction of the movement of the rack members and against one of the rack members so that that rack member moves longitudinally relative to the other rack member and the teeth of that rack member are offset from the teeth of the other rack member. Thereby, opposite sides of at least one tooth of the pinion gear at all times are simultaneously positioned between and held in engagement with at least one tooth on each of the rack members to prevent backlash on movement of the teeth.

31 Claims, 1 Drawing Sheet

ANTIBACKLASH RACK ASSEMBLY

BACKGROUND OF THE INVENTION

The present invention relates to an antibacklash rack assembly and, more particularly to such assembly in combination with a rotatable gear in which backlash is substantially reduced during operation.

Various assemblies have been employed in the past for the purpose of reducing backlash in the operation of meshed gears, including meshed pinion gears and pinion gears which mesh with longitudinally moving toothed racks. Such prior antibacklash assemblies have generally included mechanisms which act on the pinion gear to reduce the backlash, rather than on the rack where the assembly is a rack and pinion assembly.

In a few prior rack and pinion gear assemblies, mechanisms have been provided which act upon the rack to reduce backlash. However, these mechanisms are generally relatively complex or they require the manufacture and positioning or relatively complex or intricate rack parts to achieve the antibacklash function. Moreover, in these prior assemblies, the antibacklash mechanisms do not generally move or exert their antibacklash force in the same longitudinal direction in which the rack moves and in which the backlash impact forces would tend to act.

An antibacklash rack assembly incorporating the principles of the present invention is both simple in construction as well as manufacture, and effectively functions to reduce if not eliminate altogether backlash which might occur in a rack and pinion assembly. In an antibacklash rack assembly incorporating the principles of the present invention, the antibacklash force and action is imparted to the rack in the same longitudinal direction in which the rack normally moves and in which the backlash impact forces would be directed if backlash was to occur. Moreover, the antibacklash assembly of the present invention readily compensates for any wear on the rack or pinion teeth to eliminate backlash over the life of the assembly.

In one principal aspect of the present invention, an antibacklash rack includes a first longitudinally extending rack member having gear teeth which extend transversely thereof and which are adapted to receive and engage at least one tooth of a gear to mesh therewith. This first rack member is movable in a longitudinal direction. A second longitudinally extending rack member also has gear teeth extending transversely thereof and in substantially the same direction as the teeth of the fist rack member. The teeth of the second rack member also are adapted to receive and simultaneously engage the same tooth of the gear of that which meshes with the teeth of the fist rack member and the second rack member is also longitudinally movable with the first rack member. Urging means exerts a force on the second rack member in the longitudinal direction to urge at least one of the teeth on the second rack member in the longitudinal direction and in offset relationship to the teeth of the first rack member which engage the tooth of the gear which meshes with the teeth of the fist rack member. Thereby, the tooth of the gear is forced into engagement with a tooth of the first rack member and held in engagement therewith such that the opposite sides of the tooth on the gear which meshes with the teeth of the rack members are simultaneously positioned and held in engagement with at least one tooth on each of the first and second rack members to prevent backlash upon movement of any of the teeth.

In another principal aspect of the present invention, an antibacklash rack and rotatable gear combination includes at least one rotatable gear having gear teeth thereon and means for transmitting a mechanical torque relative to the rotatable gear. A first longitudinally extending rack member has gear teeth extending transversely thereof which mesh with at least one tooth of the rottable gear and the first rack member is moveable in a longitudinal direction. A second longitudinally extending rack member also has gear teeth extending transversely thereof and an substantially the same direction of the teeth of the first rack member. The teeth of the second rack member also simultaneously mesh with at least the one tooth of the first rack member, and the second rack member is also longitudinally movable with the first rack member. Urging means exerts a force on the second rack member in the longitudinal direction to urge at least one of the teeth on the second rack member in the longitudinal direction and in offset relationship to the teeth on the first rack member to engage at least one tooth of the rotatable gear and force that tooth into engagement with the tooth of the first rack member and hold it in engagement therewith. Thereby, opposite sides of the one tooth of the rotatable gear are simultaneously positioned between and held in engagement with at least one tooth on each of the first and second rack members to prevent backlash on movement of the teeth. Means is also provided for transmitting a linear force relative to the rack members.

In still another principal aspect of the present invention, the foregoing urging means comprises a spring which urges the second rack member to move in at least one longitudinal direction and relative to the first rack member.

In still another principal aspect of the present invention, a elongate guide means is provided which extends between the rack members, the guide means being fixed to one of the rack members and the outer rack member being slidable relative to the guide means.

In still another principal aspect of the present invention, the foregoing guide means comprises at least one elongate pin.

In still another principal aspect of the present invention, the foregoing guide means is fixed to the first rack member and the second rack member is slidable relative to the guide means.

In still another principal aspect of the present invention, the foregoing spring is mounted on the foregoing pin.

In still another principal aspect of the present invention, the first rack member includes an elongate opening therein and the second rack member is positioned in the opening for longitudinal movement in the opening relative to the first rack member, and the teeth of the respective rack members are longitudinally offset relative to each other by the urging means.

In still another principal aspect of the present invention, the urging means comprises a spring in the opening which bears against the rack members.

In still another principal aspect of the present invention, the force exerted by the urging means is greater than the torque on the means for transmitting a mechanical torque relative to the rotatable gear.

In still another principal aspect of the present invention, the means for transmitting a mechanical torque relative to the rotatable gear is a rotatable shaft on the gear, and the means for transmitting the linear force relative to the rack members is a fluid piston.

In still another principal aspect of the present invention, the foregoing piston is driven by fluid and the rotatable gear and shaft are driven by at least one of the rack members.

These and other objects, features and advantages of the present invention will be more clearly understood through a consideration of the following detailed description.

BRIEF DESCRIPTION OF THE DRAWINGS

In the course of this description, reference will frequently be made to the attached drawing in which.

DESCRIPTION OF THE PREFERRED EMBODIMENT

Figure 1:
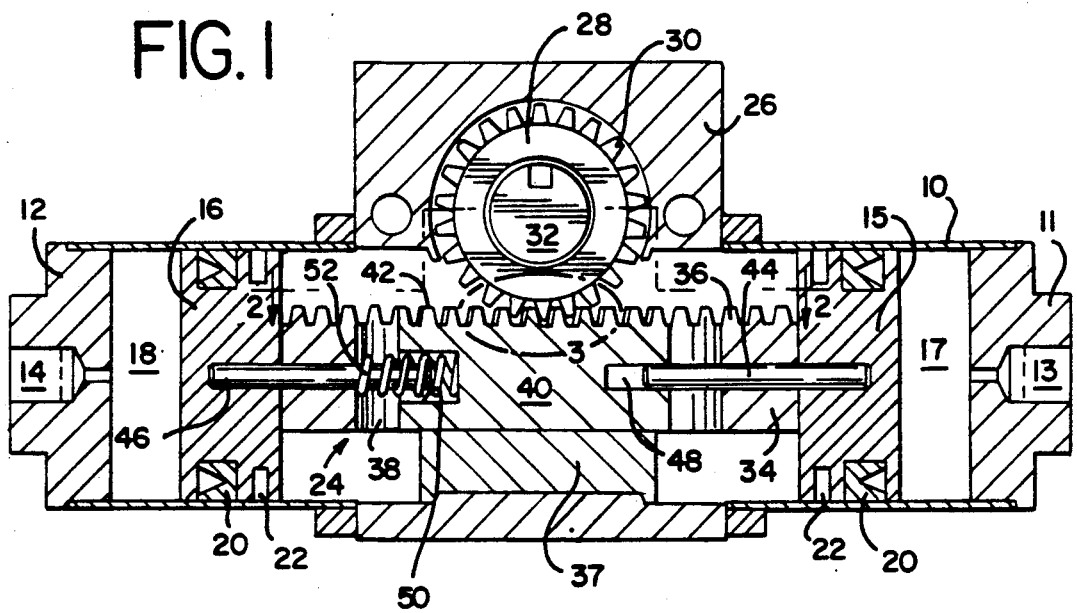
FIG. 1 is a cross-section elevational view of a preferred embodiment of antibacklash rack and gear combination of the present invention.

As best seen in FIG. 1, the preferred embodiment of rack and gear assembly of the present invention generally comprises an elongate cylinder 10 which is closed at its opposite ends by cylinder end caps 11 and 12 having fluid ports 13 and 14 communicating therethrough for the introduction and discharge of a suitable fluid, either pneumatic or hydraulic, into and from the cylinder 10. The preferred embodiment of assembly also includes a pair of pistons 15 and 16 adjacent the opposite ends of the cylinder 10. The pistons are moveable within the cylinder in a longitudinal direction. The end caps 11 and 12 together with the pistons 15 and 16 define spaces 17 and 18 therebetween to which the fluid is either admitted or from which it is discharged via the port as 13 and 14 during the operation of the assembly in order to exert a linear force on the pistons to longitudinally move the pistons 15 and 16 back and forth within the cylinder 10. As in a conventional double acting cylinder when pressurized fluid is admitted through port 13 to space 17 and vented from space 18 through pot 14 the pistons move to the left, as viewed in FIG. 1, and when these conditions are reversed the pistons move to the right as viewed in FIG. 1.

The pistons 15 and 16 also preferably include an annular fluid seal 20, as seen in FIG. 1. They may also include a magnetic ring 22 extending thereabout to enable the piston position to be sensed with a suitable magnetic sensor (not shown) mounted to the exterior of the cylinder 10.

The preferred embodiment of assembly also includes a rack assembly, generally 24, which is mounted between the pistons 15 and 16 for slidable movement therewith. The rack assembly 24 will be described in further detail later.

The assembly also includes a housing 26 which houses a rotatable gear, such as a pinion gear 28. The pinion gear 28 has teeth 30 about its circumference which mesh with the teeth of the rack assembly 24. The pinion gear 28 also includes a shaft 32 which extends from one or both sides of the pinion gear and which is adapted to transmit torque relative to the pinion gear 28.

Retuning to the description of the preferred embodiment of rack assembly 24, the assembly comprises a first rack member 34 which extends between the opposite non-working faces of the pistons 15 and 16 and is sensationally affixed thereto. The rack member 34 includes a plurality of gear teeth 36 on its upper face which extend generally transversely of the rack member 34 and which are sized and positioned to mesh with the gear teeth 30 on the pinion gear 28. Although the teeth 36 are shown as extending at substantially right angles across the rack member 34, it will be appreciated that they may also extend transferal and in other angular relationship of the sides of the rack member.

Figure 2:
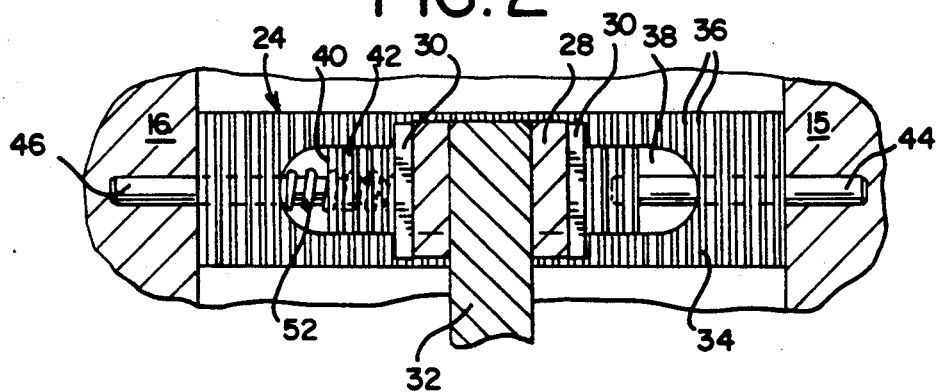
FIG. 2 is a cross-sectioned plan view of the combination shown in FIG. 1 and as viewed substantially along len 2—2 of FIG. 1.

The rack member 34 also includes a longitudinally extending slot 38 therein which is adapted to receive a second rack member 40, as best seen in FIGS. 1 and 2, for longitudinal movement within the slot 38 and with and in the same direction as the longitudinal movement of the first rack member 34.

The second rack member 40 also includes a plurality of gear teeth 42 which extend transversely of the rack member 40 and in generally parallel relationship to the gear teeth 36 on the first rack member 34. A pair of elongate guide pins 44 and 46 extend from the respective pistons 15 and 16, through the ends of the first rack member 34, into the slot 38, and into recesses 48 and 50 at each end of the second rack member 40 to guide the second rack member 40 for longitudinal movement relative to the first rack member 34 and in the slot 38. The recess 50 is slightly larger in diameter than recesses 48 to accommodate a resilient spring 52 for urging the second rack member 40 to the right as viewed in FIGS. 1 and 2. Although the spring 52 is positioned in the rack assembly 24 on the right thereof as shown in the drawing, it will be appreciated that it may also be positioned on the other end of the rack assembly without departing from the principles of the invention.

The bottom face of the rack members 34 and 40 are preferably supported on the upper surface of a bearing plate or other member 37, as best seen in FIG. 1, for longitudinal sliding movement of the rack members thereon as the pistons and rack members 34 and 40 are moved back and forth in the cylinder 10.

Although it is believed that the antibacklash operation of the foregoing preferred assembly will be evident to those skilled in the art from the foregoing description, a brief description the operation of the assembly will follow. In this description it will be assumed that the driving force of the assembly 24, which in turn will drive the pinion gear 28 to impart an output mechanical torque to the rotatable shaft 32.

It will also e assumed that pressurized fluid was last admitted through port 13 to space 17 to drive the piston 15 and the assembly to the left as viewed in the drawing. In this condition the left face of at least one rack tooth 36 on the first rack member 34 will bear against the right face of at least one of the gear teeth 30, as best viewed in solid in FIG. 3.

Figure 3:
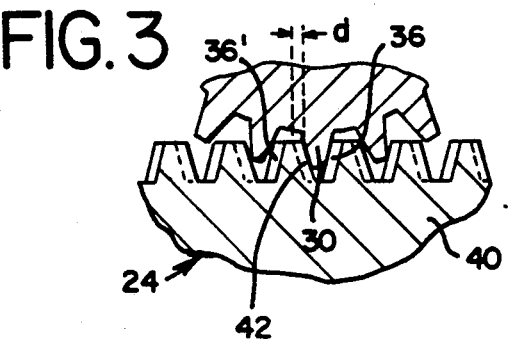
FIG. 3 is an enlarged cross-sectioned elevational view of the meshed pinion gear and rack as viewed substantially within oval 3 of FIG. 1.

Given this condition, the assembly will now be powered to the right and in the opposite direction by admission of high pressure fluid through the port 14 and into the space 18, and space 17 will be vented through port 13. When this occurs, backlash would otherwise be possible because the next adjacent rack tooth 36' on the first rack member 34, as best seen in FIG. 3, would likely have to first move through a distance d until it engages the left face of the gear tooth 30. The distance d may be the result of normal tolerances which are in the assembly, and in the more extreme case, the result of wear. However, due to the presence of the second rack member 40 which is continuously urged by the spring 52 of the right as viewed in the drawing, backlash is prevented because a right face of one of the gear teeth 42 on the second rack member 40 is already firmly positioned in offset relationship to the gear teeth 36 of the first rack member 34, and is held firmly against the left face of the tooth 30 of the pinion gear 28 as best shown in FIG. 3. In this regard, the spring force of spring 52 is selected to be greater than the maximum torque to which shaft 32 is subjected. Thus, the pinion gear 28 is actually driven in this direction by the teeth 42 of the second spring loaded rack member 40.

From the foregoing it will be seen that any given gear tooth 30 on the pinion gear 28 has both of its sides firmly clamped at all times between a side of one of the gear teeth 36 on the first rack member 34 and one of the gear teeth 42 on the second rack member 40. Thus, backlash is substantially reduced if not eliminated altogether in the operation of the assembly of the present invention. Moreover, as the teeth wear, such wear will e automatically compensated for by the longitudinal spring force exerted by the spring 52 in the direction of movement of the rack assembly 24.

It also will be seen that the antibacklash forces in the assembly of the present invention are exerted in the same longitudinal direction as the direction in which the rack assembly moves and the backlash impact forces would be exerted if backlash occurred. Thus, the assembly of the present invention is highly effective in reducing or eliminating backlash and is simple in construction.

It will be appreciated that although the foregoing description of operation is in items of engagement of a single tooth 30 on the pinion 28, in fact it is likely that more than one such tooth 30 will be in engagement at any given time with the rack teeth 36 and 42.

It also will be understood that although the present invention has been described in terms of a fluid powered assembly, the principles of the present invention may also be utilized in any assembly in which forces may be imparted to or from the rack assembly 24 by way of mechanical linkages or the like and the assembly may be driven by way of the pinion gear without departing from the principles of the present invention.

It will also be understood that the embodiment of the present invention which has been described is merely illustrative of an application of the principles of the present invention. Numerous modifications may be made by those skilled in the art without departing from the spirit and scope of the present invention.

I claim:

1. An antibacklash rack comprising:
   a first longitudinally extending rack member having gear teeth extending transversely thereof which are adapted to receive and engage at least one tooth of a gear to mesh therewith, said fist rack member being movable i na longitudinal direction;
   a second longitudinally extending rack member also having gear teeth extending transversely thereof and in substantially the same direction as the teeth of said firs rack member, the teeth of said second rack member also being adapted to receive and simultaneously engage the same tooth of the gear as that which meshes with the teeth of the first rack member, said second rack member also being longitudinally movable with said first rack member; and
   a spring means exerting a force on said second rack member in said longitudinal direction to urge at lest one of the teeth on the second rack member in said longitudinal direction and in offset relationship to the teeth on said first rack member to engage the tooth of the gear which meshes with the teeth of said fist rack member and force the tooth of the gear into engagement with a tooth of the first rack member and hold it in engagement therewith, whereby opposite sides of the tooth on the gear which meshes with the teeth of said rack members are simultaneously positioned between and held in engagement with at least one tooth on each of said first and second rack members to prevent backlash upon movement of any of the teeth.

2. The antibacklash rack of claim 1, wherein said spring urges said second rack member to move in at least one longitudinal direction and relative to said first rack member.

3. The antibacklash rack of claim 1, including elongate guide means extending between said rack members, said guide means being fixed to one of said rack members and the other rack member being slidable relative to said guide means.

4. The antibacklash rack of claim 3, wherein said guide means comprises at least one elongate pin.

5. The antibacklash rack of claim 3, wherein said guide means is fixed to said first rack member and said second rack member is slidable relative to said guide means.

6. The antibacklash rack of claim 2, including elongate guide means extending between said rack members, said guide means being fixed to one of said rack members and the other rack member being slidable relative to said guide means.

7. The antibacklash rack of claim 6, wherein said guide means comprises at least one elongate pin.

8. The antibacklash rack of claim 7, wherein said spring is mounted on said pin.

9. The antibacklash rack of claim 7, wherein said guide means is fixed to said fist rack member and said second rack member is slidable relative to said guide means.

10. The antibacklash rack of claim 1, wherein said first rack member includes an opening therein and said second rack member is positioned in said opening for longitudinal movement therein relative to said first rack member, and the teeth of the respective rack members are longitudinally offset relative to each other by said spring.

11. The antibacklash rack of claim 10, wherein said spring is in said opening and bears against said rack members.

12. The antibacklash rack of claim 10, including at least one pin extending longitudinally in said opening between said rack members to guide the movement of said second rack member relative to said first rack member.

13. The antibacklash rack of claim 12, wherein said spring is on said pin and bears against said rack members.

14. An antibacklash rack and rotatable gear combination comprising:
   at least one rotatable gear having gear teeth thereon and means for transmitting a mechanical torque relative to said rotatable gear;
   a first longitudinally extending rack member having gear teeth extending transversely thereof which mesh with at least one tooth of said rotatable gear, said first rack member being movable in a longitudinal direction;

a second longitudinally extending rack member also having a gear teeth extending transversely thereof and in substantially the same direction as the teeth of said fist rack member, the teeth of said second rack member also simultaneously meshing with said at least one tooth of said rotatable gear as that which meshes with the gear teeth of the first rack member, said second rack member also being longitudinally movable with said first rack member;

a spring exerting a force on said second rack member in said longitudinal direction to huge at least one of the teeth on the second rack member in said longitudinal direction and in offset relationship to the teeth on said first rack member to engage said at lest one tooth of the rotatable gear and force that tooth into engagement with a tooth of the first rack member and hold it in engagement therewith, whereby opposite sides of said at least one tooth of said rotatable gear are simultaneously positioned between and held in engagement with at least one tooth on each of said first and second rack members to prevent backlash upon movement of any of the teeth; and means for transmitting a linear force relative to said rack members.

15. The antibacklash rack and rotatable bear combination of claim 14, wherein said spring urges said second rack member to move in at least one longitudinal direction and relative to said first rack member.

16. The antibacklash rack and rotatable gear combination of claim 14, including elongate guide means extending between said rack members, said guide means being fixed to one of said rack members and the other rack member being slidable relative to said guide means.

17. The antibacklash rack and rotatable gear combination of claim 16, wherein said guide means comprises at least one elongate pin.

18. The antibacklash rack and rotatable gear combination of claim 16, wherein said guide means is fixed to said first rack member and said second rack member si slidable relative to said guide means.

19. The antibacklash rack and rotatable gear combination of claim 15, including elongate guide means extending between said rack members, said guide means being fixed to one of said rack members and the other rack member being slidable relative to said guide means.

20. The antibacklash rack and rotatable gear combination of claim 19, wherein said guide means comprises at least one elongate pin.

21. The antibacklash rack and rotatable gear combination of claim 20, wherein said spring is mounted on said pin.

22. The antibacklash rack and rotatable gear combination of claim 20, wherein said guide means is fixed to said first rack member and said second rack member is slidable relative to said guide means.

23. The antibacklash rack and rotatable gear combination of claim 14, wherein said first rack member includes an opening therein and said second rack member is positioned in said opening for longitudinal movement therein relative to said first rack member, and the teeth of the respective rack members are longitudinally offset relative to each other by said spring.

24. The antibacklash rack and rotatable gear combination of claim 23, wherein said spring is in said opening and bears against said rack members.

25. The antibacklash rack and rotatable gear combination of claim 23, including at least one pin extending longitudinally in said opening between said rack members to guide the movement of said second rack member relative to said first rack member.

26. The antibacklash rack and rotatable gear combination of claim 25, wherein said spring is on said pin and bears against said rack members.

27. The antibacklash rack and rotatable gear combination of claim 14, wherein the force exerted by said spring is greater than the torque on the means for transmitting a mechanical rogue relative to said rotatable gear.

28. The antibacklash rack and rotatable gear combination of claim 15 wherein said means for transmitting a mechanical torque relative to said rotatable gear is a rotatable shaft on said gear, and said means for transmitting said linear force relative to said rack members is a fluid piston.

29. The antibacklash rack and rotatable gear combination of claim 28,. wherein said piston is driven by the fluid and said rotatable gear and shaft are driven by at lest one of said rack members.

30. The antibacklash rack and rotatable gear combination of claim 27, wherein said means for transmitting a mechanical torque relative to said rotatable gear is a rotatable shaft on said gear, and said means for transmitting said linear force relative to said rack members. is a fluid piston.

31. The antibacklash rack and rotatable gear combination of claim 30, wherein said piston is driven by the fluid and said rotatable gear and shaft are driven by at least one of said rack members.

* * * * *

UNITED STATES PATENT AND TRADEMARK OFFICE
CERTIFICATE OF CORRECTION

PATENT NO. : 5,189,923

DATED : March 2, 1993

INVENTOR(S) : Paul H. Lashbrook

It is certified that error appears in the above-identified patent and that said Letters Patent is hereby corrected as shown below:

In column 1, line 52, delete "fist" and insert -- first --.
In column 1, line 55, delete "fist" and insert -- first --.
In column 1, line 56, delete "movable" and insert -- moveable --.
In column 2, line 10, delete "rottable" and insert -- rotatable --.
In column 2, line 13, delete "an" and insert -- in --.
In column 2, line 16, before "first", insert -- rotatable gear which meshes with the gear teeth of the --.
In column 2, line 40, delete "outer" and insert -- other --.
In column 3, in the title following line 10, delete "DRAWINGS" and insert -- DRAWING --.
In column 3, line 20, delete "len" and insert -- line --.
In column 3, line 41, delete "port as" and insert -- ports --.
In column 3, line 45, after "cylinder", insert a comma -- , --.
In column 3, line 47, delete "pot" and insert -- port --.
In column 4, lines 4-5, delete "sensationally" and insert -- stationarily --.
In column 4, line 12, delete "transferal" and insert -- transversely --.
In column 4, line 47, after "description" insert -- of --.
In column 4, line 49, after "assembly" insert -- is provided fluidically via the pistons 15 and 16 and cylinder 10 so as to drive the rack assembly --.
In column 4, line 52, delete "e" and insert -- be --.
In column 5, line 22, delete "e" and insert -- be --.
In column 5, line 35, delete "items" and insert -- terms --.
In column 5, line 42, delete "any" and insert -- an --.
In column 5, line 59, claim 1, delete "i na" and insert -- in a --.

UNITED STATES PATENT AND TRADEMARK OFFICE
CERTIFICATE OF CORRECTION

PATENT NO. : 5,189,923

DATED : March 2, 1993

INVENTOR(S) : Paul H. Lashbrook

It is certified that error appears in the above-identified patent and that said Letters Patent is hereby corrected as shown below:

```
    In column 5, line 63, claim 1, delete "firs" and insert
-- first --.
    In column 6, line 1, claim 1, delete "means".
    In column 6, line 2, claim 1, delete "lest" and insert -- least --.
    In column 6, line 7, claim 1, delete "fist" and insert -- first --.
    In column 6, line 41, claim 9, delete "fist" and insert -- first --.
    In column 7, line 7, claim 14, delete "fist" and insert -- first --.
    In column 7, line 15, claim 14, delete "nuge" and insert -- urge --.
    In column 7, line 20, claim 14, delete "lest" and insert -- least --
    In column 7, line 32, claim 15, delete "bear" and insert -- gear --.
    In column 7, line 47, claim 18, delete "si" and insert -- is --.
    In column 8, line 32, claim 27, delete "rogue" and insert
-- torque --.
    In column 8, line 35, claim 28, delete "15" and insert -- 14 --.
    In column 8, line 41, claim 29, before "wherein" delete the period.
    In column 8, line 43, claim 29, delete "lest" and insert
-- least --.
```

Signed and Sealed this

Twenty-second Day of February, 1994

Attest:

BRUCE LEHMAN

*Attesting Officer*        *Commissioner of Patents and Trademarks*